United States Patent [19]

Stringer et al.

[11] 4,104,407
[45] Aug. 1, 1978

[54] EXPANDED ANIMAL FOOD COATED WITH DEXTRIN AND FAT

[75] Inventors: William G. Stringer; Robert E. Schara, both of Battle Creek; Charles T. Stocker, Augusta, all of Mich.

[73] Assignee: General Foods Corporation, White Plains, N.Y.

[21] Appl. No.: 527,731

[22] Filed: Nov. 27, 1974

Related U.S. Application Data

[63] Continuation of Ser. No. 337,337, Mar. 2, 1973, abandoned.

[51] Int. Cl.² ................................................ A23J 3/00
[52] U.S. Cl. .......................................... 426/99; 426/96; 426/103; 426/307; 426/805; 426/560; 426/623
[58] Field of Search ................. 426/92, 94, 96, 98, 426/99, 103, 291, 293, 295, 302, 303, 307, 805, 559, 560, 623, 625

[56] References Cited

U.S. PATENT DOCUMENTS

| 3,094,947 | 6/1963 | Green et al. | 426/290 |
|---|---|---|---|
| 3,119,691 | 1/1964 | Ludington et al. | 426/99 |
| 3,615,647 | 10/1971 | Kassens | 426/305 |

Primary Examiner—Norman Yudkoff
Attorney, Agent, or Firm—T. J. Carvis; D. J. Donovan; B. P. Struzzi

[57] ABSTRACT

The present invention is concerned with the preparation of an improved expanded dry animal food composition based on farinaceous and proteinaceous constituents. Chunks or kibs of the expanded product are coated in separate layers with a first layer of dextrin material and a second exterior layer of fat. The kibs may optionally be coated with a gravy forming material such that a gravy is formed when water is added. The coating of the dextrin material serves to retard the rate of hydration when water is added such that the chunks retain their crunchy texture and structure for longer periods of time with the result that the product is of improved animal acceptance.

2 Claims, No Drawings

EXPANDED ANIMAL FOOD COATED WITH DEXTRIN AND FAT

This is a continuation of application Ser. No. 337,337, filed Mar. 2, 1973, now abandoned.

BACKGROUND OF THE INVENTION

There are several chunk style dry animal food products on the market today which are particularly appealing to the consumer due to their shelf stability and convenience. These products are specifically formulated using proteinaceous and/or farinaceous source ingredients, and are characterized by a porous structure and crunchy texture. These products may be served as is or may be rehydrated with water prior to consumption by the dog or cat. The palatability of these products is further enhanced by a coating of fat on the surface of the chunk or kib, over which coating may be applied a powdered gravy forming material based on gums, starches, coloring and flavoring material. Upon hydration, the gravy forming material serves to thicken and color the water thereby simulating a gravy or meat sauce.

Such products may be manufactured by preparing a mixture of farinaceous and/or proteinaceous ingredients with optional vitamin and mineral supplements, said mixture having a moisture content within the range of about 20 to 40% by weight. This mixture is processed by heating it above about 212° F and subjecting it to superatmospheric pressure and masceration such as in an extruder, and extruding it through an extrusion die into the atmosphere. As the material issues from the die it expands into a porous, expanded product due to the pressure drop across the die and the flashing off of the water as steam. The extrudate is then cut into bite size kibs having a mean diameter within the range of about ¼ to ¾ inch, dried to a moisture content of less than about 10% by weight, coated with fat and optionally a powdered gravy forming ingredient, and packaged. Examples of such products and the methods for preparing them may be found in U.S. Pat. Nos. 3,119,691 and 3,447,929.

Kennel studies show that the aforementioned products have greater appeal to the pet when served mixed with water. However, due to the porous nature of the product, the kibs rapidly absorb water such that in a period of five minutes or so the kibs have lost much of their crunchy texture, particularly attractive to dogs, and become soggy or mushy. Thus, a certain amount of waste and inconvenience to the consumer may be encountered unless the hydrated kibs are consumed by the pet quickly after serving.

Accordingly, it is an object of this invention to prepare a hydratable animal food product which retains its crunchy and crispy texture for longer periods of time when served with water.

A further object of this invention is to prepare a hydratable animal food of improved palatability which exhibits an improved resistance to quick wetting and also the tendency to become mushy or soggy after periods of exposure to water.

SUMMARY OF THE INVENTION

It has been found that dry, porous, expanded animal food products of improved resistance to the tendency to become mushy or soggy in liquid can be produced by applying a first separate coating of a dextrin material to an expanded animal food kib and then a second exterior coating of fat. A gravy-forming material may then optionally be coated on the kibs if desired.

The animal food of this invention displays substantially improved resistance to rapid hydration when added to liquid and retains its crunchy character after long periods of time.

DETAILED DESCRIPTION OF THE INVENTION

The dry-particulate, porous, expanded animal food products of this invention comprises a mixture of farinaceous and proteinaceous materials having a coating of dextrin material and an exterior coating of fat.

The farinaceous ingredients according to this invention may be wheat, corn, barley, oats, their derivatives such as corn meal, hominy, and other like ingredients. Typically, the total amount of farinaceous ingredients based on the weight of the farinaceous/proteinaceous mixture is between 35 to 70% by weight.

The proteinaceous ingredients used in the mixture may be of vegetable, animal or fish origin, and typically soy bean meal, soy grits, meat meal or fish scrap. Typically the proteinaceous ingredients comprise from about 20 to 50% by weight of the total mixture.

The balance of the mixture may comprise salts, flavorings, colorings, vitamin supplements and other like ingredients to form a nutritionally balanced animal food product.

In preparing the animal food kibs of this invention, the above-recited materials are mixed together and then mechanically worked under elevated temperatures and pressures, generally in an extruder apparatus, to form an expended porous product. Typically the temperatures in the extruding zone are above 212° F. Steam and/or water is generally injected to control moistures and temperatures. The residence time of the mixture in the extruder is relatively short and generally in the order of 15 seconds to 120 seconds. The mixture exits the extruder into the atmosphere through an extruder die orifice. As the material issues from the die it expands into a porous expanded product due to the pressure drop across the die and the flashing off of the water as steam. The extrudate, typically in rope form having a moisture content of about 20% to 35% by weight is then cut into the desired kib size and dried to a stable moisture content generally about 10% and lower.

According to this invention, the animal food kibs are first coated with a dextrin material. Generally, the dextrin material is coated as a solution which dries upon contact with the kib surface. The dextrin material according to this invention must of course be an edible one and one that does not adversely affect or influence the taste or odor of the final product. Material such as corn syrup, corn syrup solids, dextrins and other like starch hydrolysis products and mixtures thereof have all been found satisfactory as coating materials for this invention. Generally, the dextrin coating is applied such that the final product contains about 1 to 8% by weight of the dextrin material.

This first coating may be applied by spraying a solution of the dextrin material onto the kibs in the form of a fine mist, tumbling the kibs in a solution of the material, or other like methods.

After the kibs have been coated with the dextrin material they are coated on the exterior thereof with fat. In general, the fat coating process is such as described in U.S. Pat. No. 3,119,691. The fat is liquified and, again, either sprayed onto the dextrin coated kibs or the kibs are tumbled in a fat solution. Generally, the fat is present between about 1 to 8% by weight of the final animal food product.

In general, the dextrin material and fat will dry upon contact with the kibs. However, drying after the addition of either component may be necessary to remove additional moisture, especially where high levels of each component are used.

The kibs may then further have a gravy-forming and thickening agent coated thereon such that a simulated gravy or sauce results when water is added to the kibs.

The dry animal food products of this invention are found to retain their crispy, crunchy texture in water for substantially longer periods than uncoated kibs or kibs with a fat coating alone. The improved kibs of this invention are more resistant to become soggy or mushy due to rapid, extensive hydration and accordingly are more appealing and palatable to pets.

The invention is further illustrated by the following examples.

EXAMPLE I

A batch of dry, expanded animal food kibs were prepared from the following ingredients:

|  | % |
| --- | --- |
| Hominy feed | 37 |
| Wheat grey shorts | 13 |
| Corn germ meal | 9.6 |
| Soybean Oil Meal | 16 |
| 52% meat meal | 17 |
| Wheat germ meal | 3 |
| Dried milk | 0.9 |
| Beet pulp | 1.7 |
| Fish scrap | .7 |
| Brewer's yeast | 0.5 |
| Salt | 0.5 |
| Vitamins and minerals | 0.1 |

The ingredients were mixed together and water and steam passed to the mixture to raise the water content to about 27%. The mixture was then placed in a Wenger extruder operating at temperatures averaging about 250° F. The pressure just before the die orifice was about 300 psig and the mixture was issued through the circular extruder die into atmosphere in the form of an expanded rope at about 180° F. The rope was cut into kibs of about ¾ inch length and dried at 250° F for 10 minutes to a moisture of about 7–8%.

EXAMPLE II

The kibs from Example I were separated into groups and treated as follows:

Sample 1 — untreated kibs

Sample 2 — kibs coated with 4% tallow by spraying kibs with liquified tallow at about 150° F.

Sample 3 — kibs coated with corn syrup (2.0 lbs corn syrup, 2.0 lbs hot water for 45.6 lbs kibs) in the form of a spray. These coated kibs were then additionally coated with 2.4 lbs of liquified tallow as in Sample 2.

All the samples were then dried at 250° F. for 10 minutes.

In order to compare the resistance of the samples to rapid, extensive hydration, the following procedure was employed. Two-hundred (200) grams of each sample were added to 400 ml of water at 110° F and mixed for 15 seconds. After 3 minutes, the samples were poured onto 20 mesh screens (U.S.) and the free liquid was drained and measured. The amount of free liquid was subtracted from the 400 ml of original water, divided by the weight of the sample, and multiplied by 100 to get a percent rehydration figure. The higher the figure, the less free liquid collected and, therefore, the more water absorbed by the sample.

The results were as follows:

| Sample 1 | 117.5% |
| Sample 2 | 110.0% |
| Sample 3 | 62.5% |

Further, the animal food prepared according to Sample 3 was found to still be crisp and crunchy even after 10 minutes in water while the animal foods of Samples 1 and 2 were mushy and soggy after an equivalent time in identical amounts of water.

EXAMPLE III

The kibs from Example I were coated with 4% tallow by spraying the kibs with liquified tallow at about 150° F. 45.6 lbs. of the kibs from Example I were coated with a solution prepared from 3 lbs. water (180° F) and 1 lb. of Crystal Gum, a tapioca dextrin manufactured by National Starch Co., and then an exteria coating of 2.4 lbs. liquified tallow at 150° F.

Using the rehydration test explained in Example II, the fat coated kibs exhibited 117.5% rehydration while the kibs coated with separate layers of dextrin material and tallow had a percent rehydration of 55.0%.

The dextrin/fat coated kibs of this Example were found to still be crisp and crunchy and not fully rehydrated even after 15 minutes in water. The kibs coated with tallow only had become fully rehydrated and soggy after 9 minutes.

As can be seen from the above examples, then, the animal food product of this invention displays a substantially improved resistance to rapid extensive hydration and to losing its crispiness in water. The net result is a more appealing and palatable product.

The examples presented are to be understood as illustrations of specific embodiments of this invenion and are not intended to be limiting in any way. Obvious variations and alterations of both the product and process of this invention are believed ascertainable without departing from the scope and spirit of the invention and the appended claims.

We claim:

1. A dry, particulate, porous, nutritionally balanced animal food product comprising an expanded mixture of between 35 to 70% by weight farinaceous and from about 20 to 50% by weight proteinaceous ingredients, said animal food product having thereon a first coating of from about 1 to 8% by weight of a dextrin material selected from the group consisting of corn syrup, corn syrup solids, dextrins, and mixtures thereof and a second exterior coating of from 1 to 8% by weight of fat, said animal food product characterized by its improved resistance to rapid extensive hydration when mixed with liquid and improved palatability.

2. In a method of preparing an expanded, porous, dry, particulate nutritionally balanced animal food product wherein a mixture of between 35 to 70% by weight farinaceous and from 20 to 50% by weight proteinaceous ingredients is mechanically worked at elevated pressures and temperatures, extruded through a die orifice into atmosphere to cause said mixture to expand, cut into a desired shape and size, and dried, the improvement comprising coating said product with a solution of a dextrin material selected from the group consisting of corn syrup, corn syrup solids, dextrins and mixtures thereof, such that said product contains about 1 to 8% by weight of said dextrin material, and then applying a second exterior coating of from 1 to 8% by weight fat to said product.

* * * * *